D. S. Wood,

Pump Piston,

No. 2,763. Reissued Sep. 10 1867.

Witnesses,
Geo. L. Chapin.
H. L. Chapin.

Inventor.
David S. Wood

N. PETERS, PHOTO-LITHOGRAPHER, WASHINGTON, D. C.

United States Patent Office.

DAVID S. WOOD, OF DELAWARE, WISCONSIN.

*Letters Patent No.* 56,314, *dated July* 10, 1866; *reissue No.* 2,763, *dated September* 10, 1867.

IMPROVEMENT IN PUMP-PISTONS.

The Schedule referred to in these Letters Patent and making part of the same.

TO ALL WHOM IT MAY CONCERN.

Be it known that I, DAVID S. WOOD, of Delaware, Walworth county, and State of Wisconsin, have invented a new and improved Piston for Water-Pump; and I do hereby declare that the following is a full, clear, and exact description of the same, reference being had to the accompanying drawings and letters of reference marked thereon, in which—

The object of my invention is to provide a pump-piston to be used in elevating and forcing water or other liquid. The said piston is so arranged and constructed that it will be more durable and effective in its operation than those heretofore used.

The invention consists in the use of an adjustable annular packing, operating loosely in a channel made in the outside of the piston-head in such a manner as to allow the water to expand the packing during the upward stroke of the piston, and thereby to create the vacuum below and to allow sand and gravel to pass from the annular space at the back of the packing out between the packing and the lower shoulder of the channel during the downward stroke of the piston.

To enable others skilled in the art to make and use my invention, I will describe the method of construction and operation.

Figure 1:
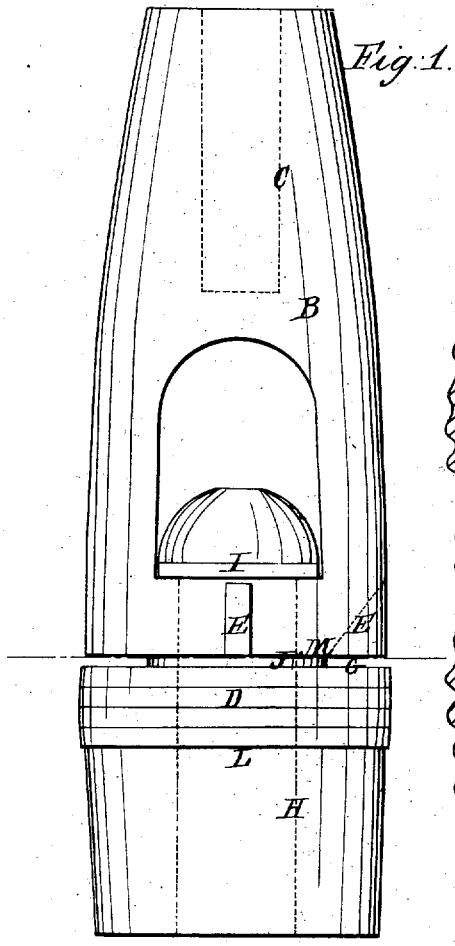
Figure 1 is an elevation of my improved piston for water-pump.
Figure 2:
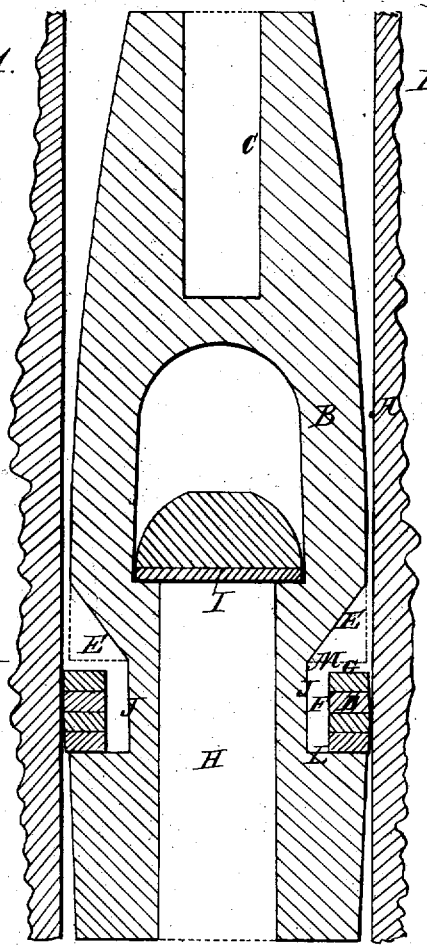
Figure 2 is a central sectional elevation of the same.
Figure 4:
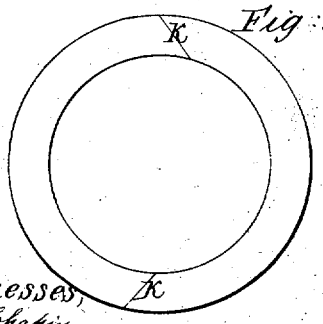
Figure 4 is a plan view of the packing.
Figure 3:
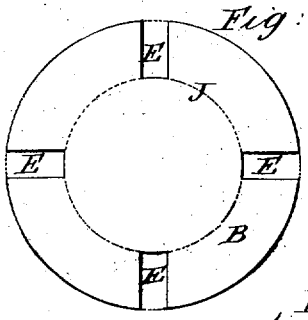
Figure 3 is a horizontal section of the piston, taken through fig. 1, at the point indicated by the line *x x*.

A represents a section of the pump-stock, in which the piston operates. B is the piston, which may be constructed and arranged in any suitable manner. C shows the hole in which the piston-rod is secured; I, the valve-rod; H, the opening through which the water passes, all of which are constructed in the usual manner. M J L show the three sides of the channel made in the outer side of the part B for the purpose of holding the packing D in the proper place. This channel is made of sufficient depth to form the water-chamber F, fig. 2, between the packing and the back of the chamber J. The object of this chamber is to allow the water to press against the inside of the packing, so that the outside of the same may press against the inside of the pump-stock and prevent the escape of the water downward past the packing. E represents the conductors, which convey the water into the chamber F. The width of the channel M J L is made greater than the packing, for the purpose of giving sufficient space around the same, so that it may not be choked or rendered inoperative by means of sand or gravel. D shows the packing, constructed in two parts, the ends meeting in a lap-joint, as seen at K, fig. 4. The object of this kind of joint is to allow the ends of the packing to meet when the same is worn by use, still it is evident that any other kind of joint, as well as any suitable number of pieces, may be used in the packing. The material used is the same as that in common pistons, the packing being leather or other suitable material.

When the piston has been constructed as described it may be operated without further care in the usual manner. When the piston is forced downward the packing will fill the space G, and a space will be made below the packing of similar size, the packing being adjusted loosely in the channel M J L.

Having thus fully described my device, what I claim as new, and desire to secure by Letters Patent of the United States, is—

The expansible loose packing D, arranged on a piston which is provided with a channel wider and deeper than the packing for the reception of the same, substantially as and for the purpose herein shown and described.

DAVID S. WOOD.

Witnesses:

WM. F. MCNAMARA,

ALEX. F. ROBERTS.